(12) United States Patent
Mangrulkar et al.

(10) Patent No.: US 7,149,645 B2
(45) Date of Patent: Dec. 12, 2006

(54) METHOD AND APPARATUS FOR ACCURATE ON-DIE TEMPERATURE MEASUREMENT

(75) Inventors: Kedar Mangrulkar, Folsom, CA (US);
Sanjeev Jahagirdar, Folsom, CA (US);
Varghese George, Folsom, CA (US);
Venkatesh Prasanna, Folsom, CA (US); Inder Sodhi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 11/024,679

(22) Filed: Dec. 30, 2004

(65) Prior Publication Data

US 2006/0161373 A1    Jul. 20, 2006

(51) Int. Cl.
*G01K 1/00*    (2006.01)
*G06F 15/00*    (2006.01)

(52) U.S. Cl. ................................. 702/130; 702/132

(58) Field of Classification Search ........ 702/130–132; 257/197, 200, 288, 706; 374/178; 219/243
See application file for complete search history.

(56) References Cited

U.S. PATENT DOCUMENTS 6,980,918 B1 * 12/2005 Gunther et al. ............. 702/132

* cited by examiner

*Primary Examiner*—John Barlow
*Assistant Examiner*—John Le
(74) *Attorney, Agent, or Firm*—Kenyon & Kenyon LLP

(57) ABSTRACT

A device and method for continually monitoring multiple thermal sensors located at hotspots across a processor. The sensors are connected to a sensor cycling and selection block located at a periphery of the die. The output from the sensor selection block is converted into a digital temperature code. Based on the digital temperature code, thermal events trigger various thermal controls. The thermal event triggers may be software-programmable, providing flexible temperature management.

32 Claims, 7 Drawing Sheets

METHOD AND APPARATUS FOR ACCURATE ON-DIE TEMPERATURE MEASUREMENT

TECHNICAL FIELD

Embodiments of the present invention relates to devices and methods for temperature measurement on processors, and more particularly to on-die circuits and methods for temperature measurement and reporting.

BACKGROUND

Thermal measurement and control are a significant part of mobile platform architecture and operating systems (e.g., Microsoft Windows®, and Linux operating systems). Modern central processing units ("CPUs"), with increasing processor core frequencies and power densities, are rapidly reaching a point in which the CPU performance is limited by the amount of heat that can be extracted from the CPU by cooling technology.

High performance CPUs often integrate an on-die thermal diode that converts junction temperatures to some electric value. External analog-to-digital ("A/D") devices can be found on several computer platforms, converting the electric value into usable information for temperature control. Due to routing and accuracy limitations, the thermal diode is placed in locations which are not at a hotspot of the CPU. Temperature differences as high as 15 degrees C. have been observed between the diode location and the CPU hotspot. The result is inaccurate temperature reading and discrepancy between the reported value and the actual temperature, affecting both device specification and control. Inaccurate temperature readings result in higher design margins, increased cooling costs, and limited functionality.

Another thermal protection mechanism uses a separate sensor to detect a maximum threshold temperature at the hottest location on the die. Once the threshold is reached, a single trigger occurs and thermal protection is initiated. Other than this single trigger, the sensor provides no other feedback for use in thermal or acoustic management.

If this second sensor is external to the device, the external sensor suffers from latency and accuracy problems resulting from the physical separation of the sensor from the hotspot.

There is a need for improved on-die temperature monitoring to improve performance in a thermally constrained environment.

DETAILED DESCRIPTION

Embodiments of the present invention integrate and continually monitor multiple thermal sensors at hotspots across a processor. The sensors are connected to a sensor cycling and selection block which may be located at a periphery of the die. The output from the sensor selection block is converted into a digital temperature code. Based on the digital temperature code, thermal events trigger various thermal controls.

Figure 1:
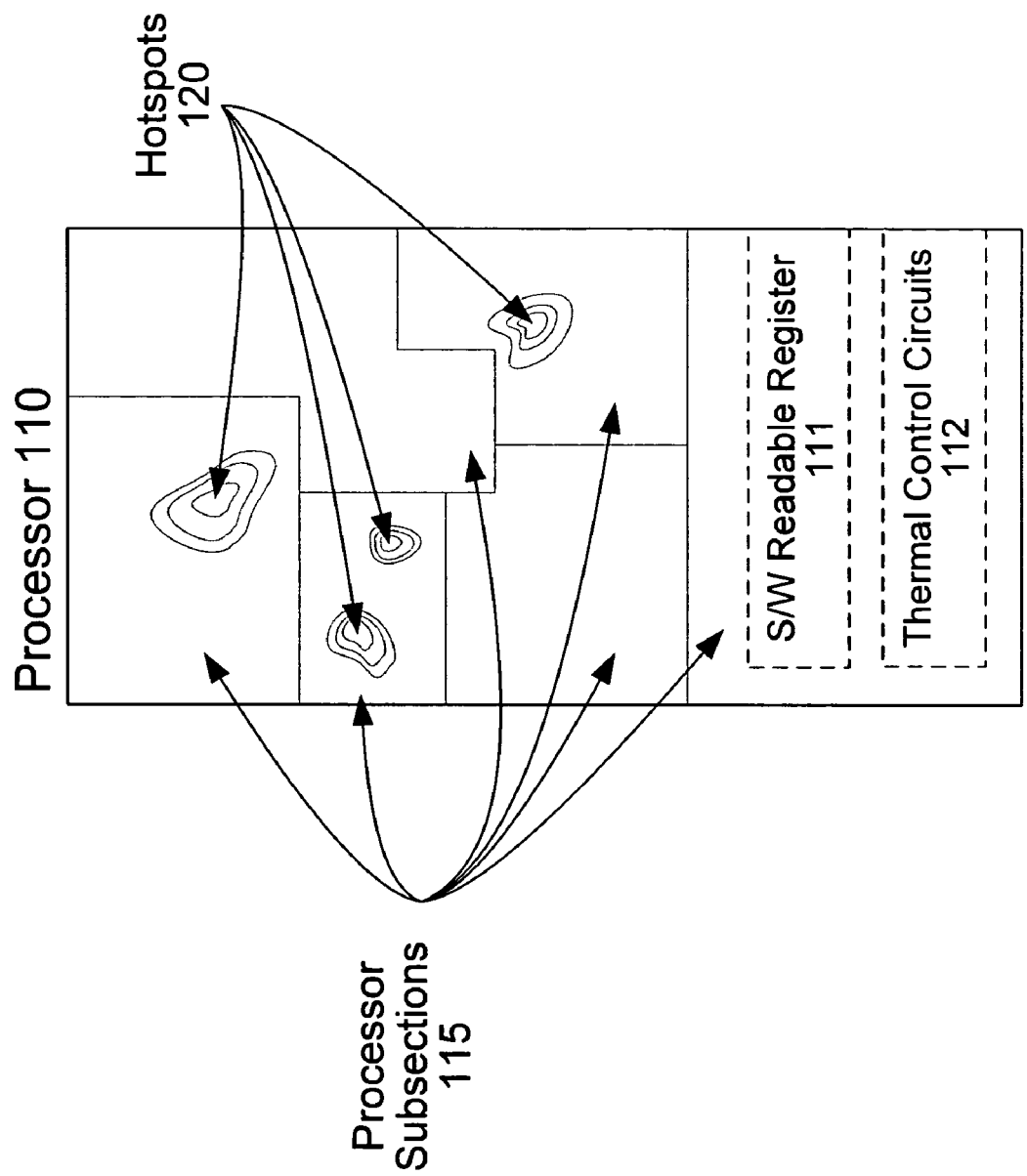
FIG. 1 illustrates a processor having a plurality subsections and hotspots.

As illustrated in FIG. 1, die temperature profiles for different applications (like integer and floating point) and processor subsections 115 may cause distinct hotspots 120 on the processor 110. By polling sensors at each of the hotspots, information such as the maximum temperature on the dies can be determined. This eliminates the need to put a large guard band on the trip temperature settings to account for different hotspots.

Figure 2:
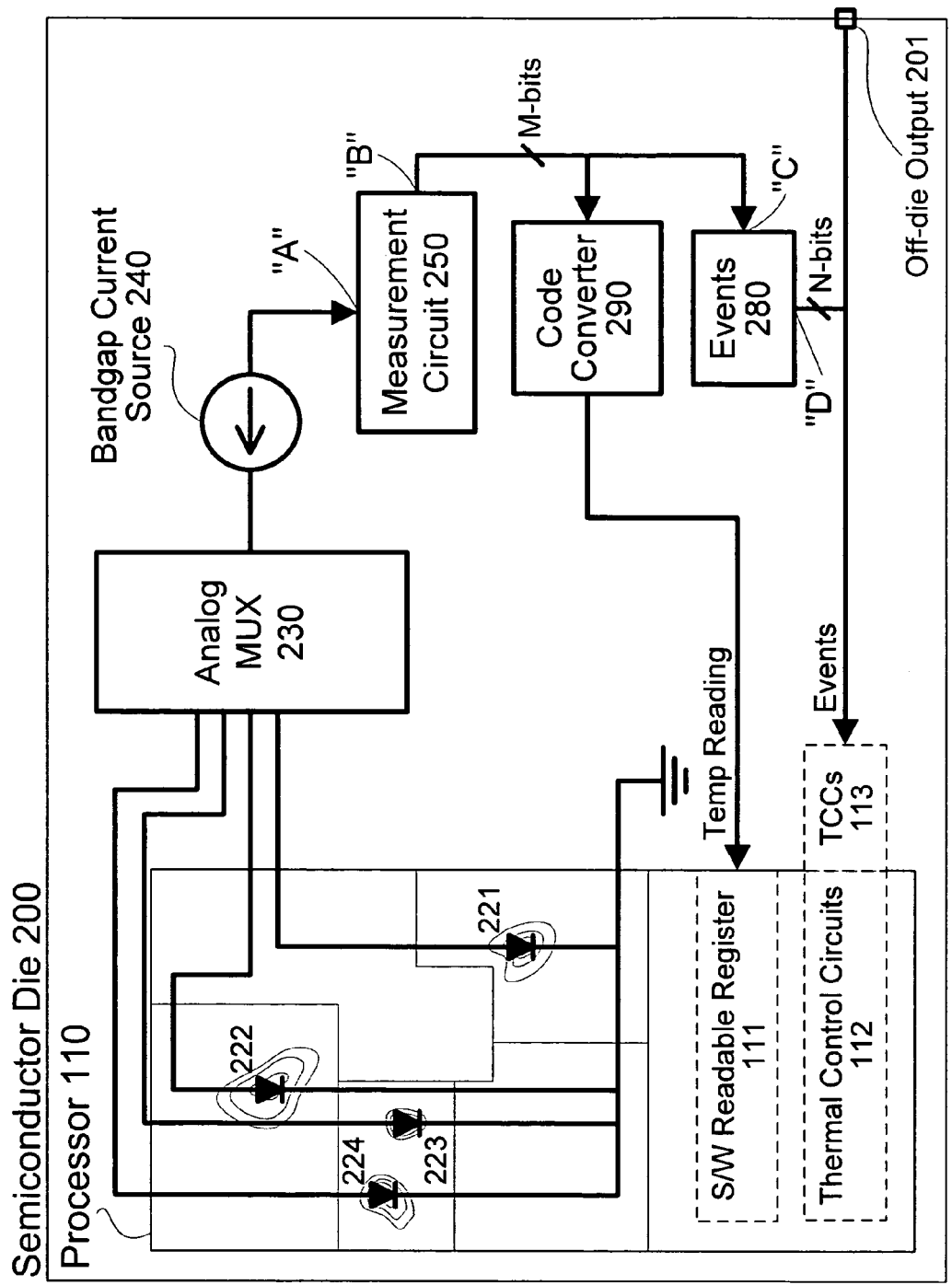
FIG. 2 is a schematic diagram of a circuit which monitors the temperature in the plurality of hotspots.

FIG. 2 illustrates an embodiment of the invention using diodes 221–224 as the temperature sensors. Although diodes are used herein as examples, the invention is not so limited. Any temperature sensor can be used, such as other types of P-N junction devices (e.g., a transistors). P-N junction devices, besides being easy to integrate with the processor, respond very quickly to temperature changes and do not require a reference temperature.

As an embodiment of the invention, the sensing diodes and the temperature calculation circuitry are physically separate. Only a very small sensing diode needs to be placed at each hotspot. Prior to fabrication, the hotspots of the processor are identified by modeling, empirical data, analysis of the package, and/or by other conventional techniques. The die area needed for each sensing diode is very small (e.g., 50×50 microns), allowing for easy placement of multiple sensing diodes with minimal disruption to processor design.

The diodes are polled by an analog multiplexer 230. Any type of analog multiplexer can be used, such as a multiplexer of complementary pass-gates, and polling may be in accordance with any polling technique. A counter or number generation circuit may be included to control polling. Software or firmware on the processor may also control the order of polling.

The diodes can either be continually biased or current can be selectively applied as the diode is polled. As shown in FIG. 2, a band-gap current source 240 is connected at the output of the analog multiplexer 230, providing current to the selected diode through the multiplexer. Although any current source may be used, a band-gap based device maintains consistent operation as package temperatures change. An example of a band-gap current source is a band-gap comparator.

The current source may be programmable, providing a calibrated bias current to all sensors, or a specific bias current to each sensor. By setting the bias current, the resolution of the temperature sensor and the granularity of measurement can be adjusted and calibrated (e.g., 50–100 degrees C., or 25–75 degrees C.). An exemplary method of programming is to include a switch or switches (e.g., fuses set during calibration) which control the bias current. Software or firmware control may also be included to provide further adjustment during device operation.

The analog signal from the selected diode is provided to a measurement circuit 250 (point "A"), for conversion into a digital temperature code (output at point "B"). The temperature code may be routed to the code converter block 290. The code converter 290 converts the raw code into temperature by scaling it with appropriate scaling constants and compensating for non-linearity. For example, the scaled temperature output by the code converter may be in a conventional unit such as Celsius, Kelvin, or Fahrenheit, to facilitate ease of interpretation by third-party software executed on the processor. The code converter 290 may also perform limit checks to identify if the temperature reading is within a valid range.

The code converter block may be a unique circuit, may be part of the processor hardware, or may be a software or firmware function on the processor. Exemplary implementations of the code converter blocks are a non-volatile memory (e.g., containing a lookup table), a programmable array (e.g., applying a scaling constant), and a microcode subroutine executed on the processor. Calibration routines for the code converter (and the device in general) may include thermally soaking the device in heat and programming the converter and/or blowing fuses so that the measured temperature(s) correspond to the actual temperature. For example, trim and resolution inputs to the code converter block may be programmed through fuses during production.

The output of the code converter may be provided to a software readable register 111, which may be internal to the processor or readable from the processor. The software readable register can be used to generate trips based on set points programmed by software, allowing among other things, reprogramming the temperature trip generation block 280 during operation by firmware or software executed on the processor 110. Since the trip points may be programmable, temperature trip generation block 280 can effectively provide an unlimited number of trip points during operation. Further, these trips can be used to generate interrupts, can be routed on processor pins, and can provide feedback to the processor or to software executed on the processor. The raw temperature code output by measurement circuit 250 may also be provided to a software readable register.

The temperature value output from measurement circuit 250 is also input (point "C") into the temperature trip generation block 280. Event triggers output (point "D") from the temperature trip generation block 280 may used for thermal control both on-die (e.g., thermal control circuits 112, 113) and off-die, such as modifying clock speeds of the processor, modifying operating voltages of the processor, activating external fans or cooling systems, modifying the output of an external power supply, and putting a portion or an entirety of the processor into a standby state. One example is a hierarchical throttling scheme which takes different action in response to different temperature trips. This form of processor thermal control is efficient in controlling the temperature on the processor die.

Figure 3:
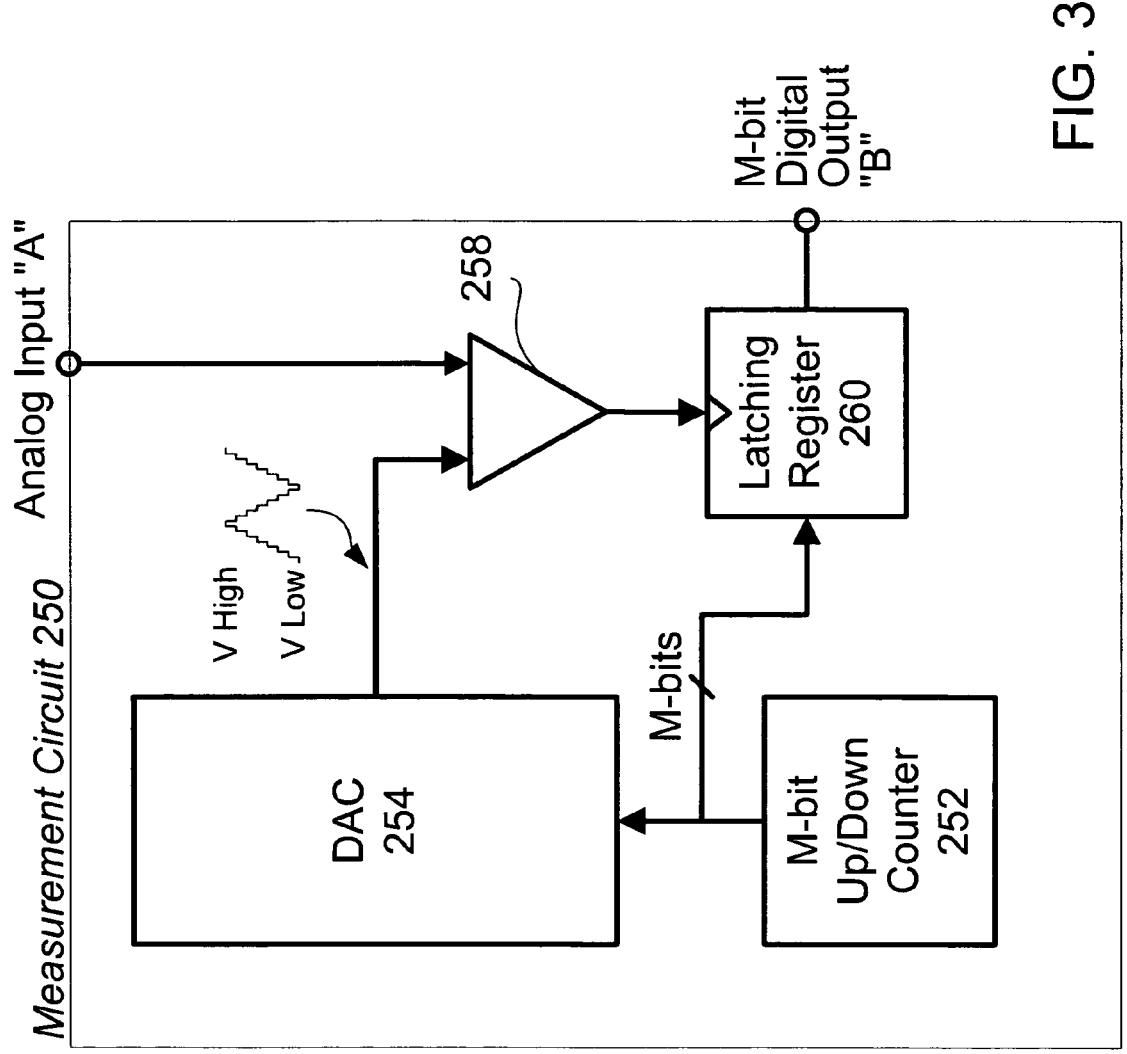
FIG. 3 is a schematic diagram of an embodiment of the measurement circuit in FIG. 2.

FIG. 3 illustrates an embodiment of the measurement circuit 250. A binary number is generated by a counter 252. The binary number is converted into an analog reference signal by digital-to-analog converter 254. The analog input from the temperature sensor is compared with the reference signal by analog comparator 258. A logic-state transition at the output of the analog comparator 258 indicates that the binary number is roughly equivalent to the sensor temperature, causing register 260 to latch the binary number as the raw temperature code. The latching register may be either internal or external to the processor, and may be software readable. The logic state transition may also be used as a trigger to advance the analog multiplexer 230 to the next sensor.

In one embodiment, the counter 252 generates an alternating pattern of increasing and decreasing binary numbers, which the digital-to-analog converter converts into an analog signal having a triangular pattern over time alternating between a higher and a lower voltage potential. The higher and lower voltage potential may be programmable, permitting adjustment of resolution during calibration, or by software or firmware during operation.

The continual up-and-down pattern is simple to implement and facilitates rapid measurement of temperature. However, any number generation scheme can be used. For example, the counter can sweep in one direction and reset when a transition occurs at the output of the comparator 258. The frequency of the sweep through the binary number sequence may be completely independent of the operating frequency of the processor 110, such that the frequency of the sweep can be optimized for the response time of the analog components of the measurement circuit 250.

Figure 4:
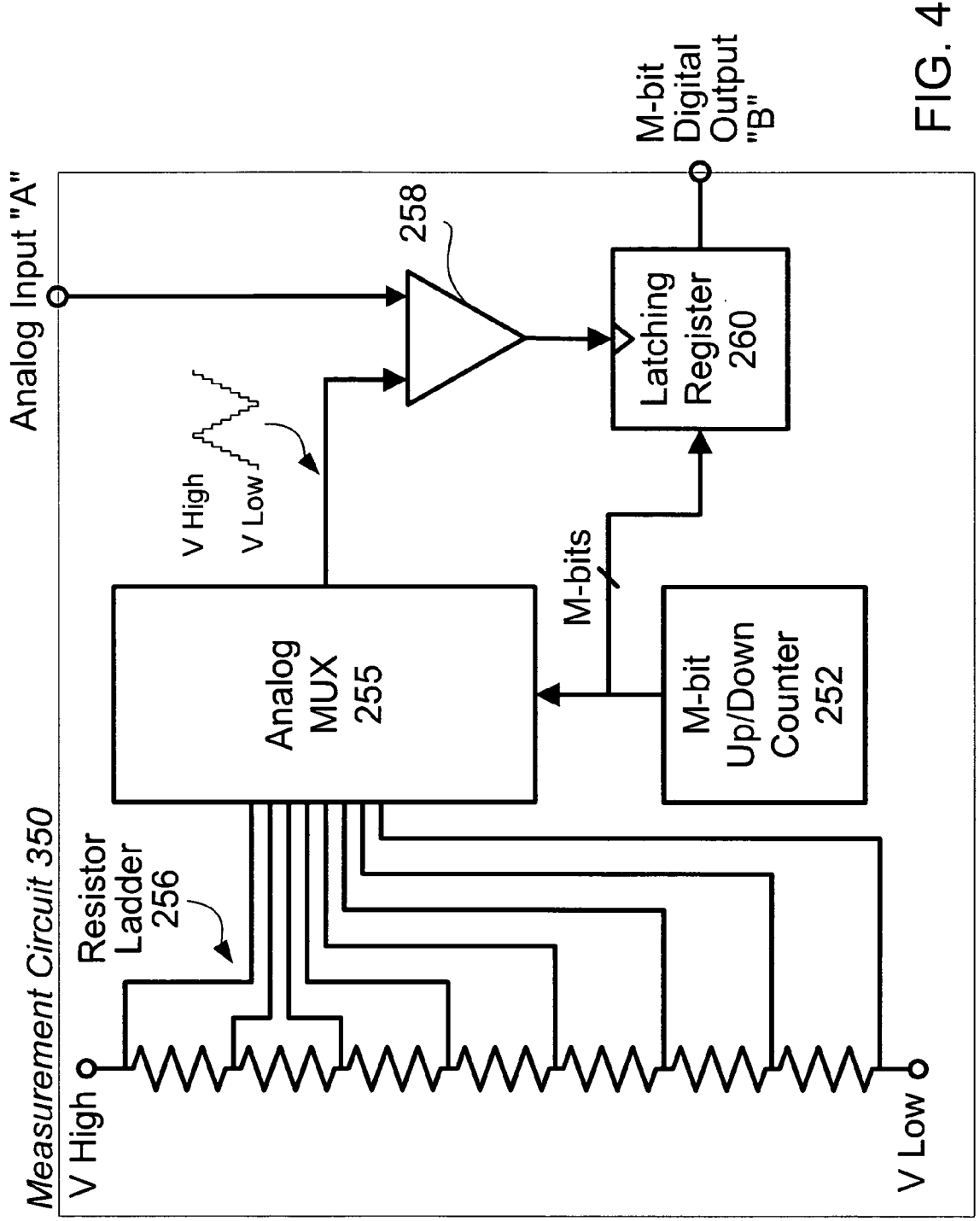
FIG. 4 is a schematic diagram of another embodiment of the measurement circuit in FIG. 2.

FIG. 4 is an embodiment of another measurement circuit 350. Measurement circuits 250 and 350 are interchangeable, and are substantially the same. However, instead of a generic digital-to-analog converter 254, digital-to-analog conversion in measurement circuit 350 is provided by a resistor ladder 256 together with an analog multiplexer 255. The resistor ladder 256 comprises a plurality of resistances in series. One end of the resistor ladder is connected to a higher voltage potential (V High) than a voltage potential connected at the other end (V Low). The analog multiplexer 255 has inputs electrically connected to hierarchy points on the resistor ladder, to select one of the inputs for output in accordance with the binary number.

An advantage of measurement circuits 250 and 350 over conventional analog-to-digital converter designs is a smaller die footprint. Much of the circuit is scalable. Also, since very little current needs to pass through the resistor ladder 256, the resistor ladder can be made very compact.

Figure 5:
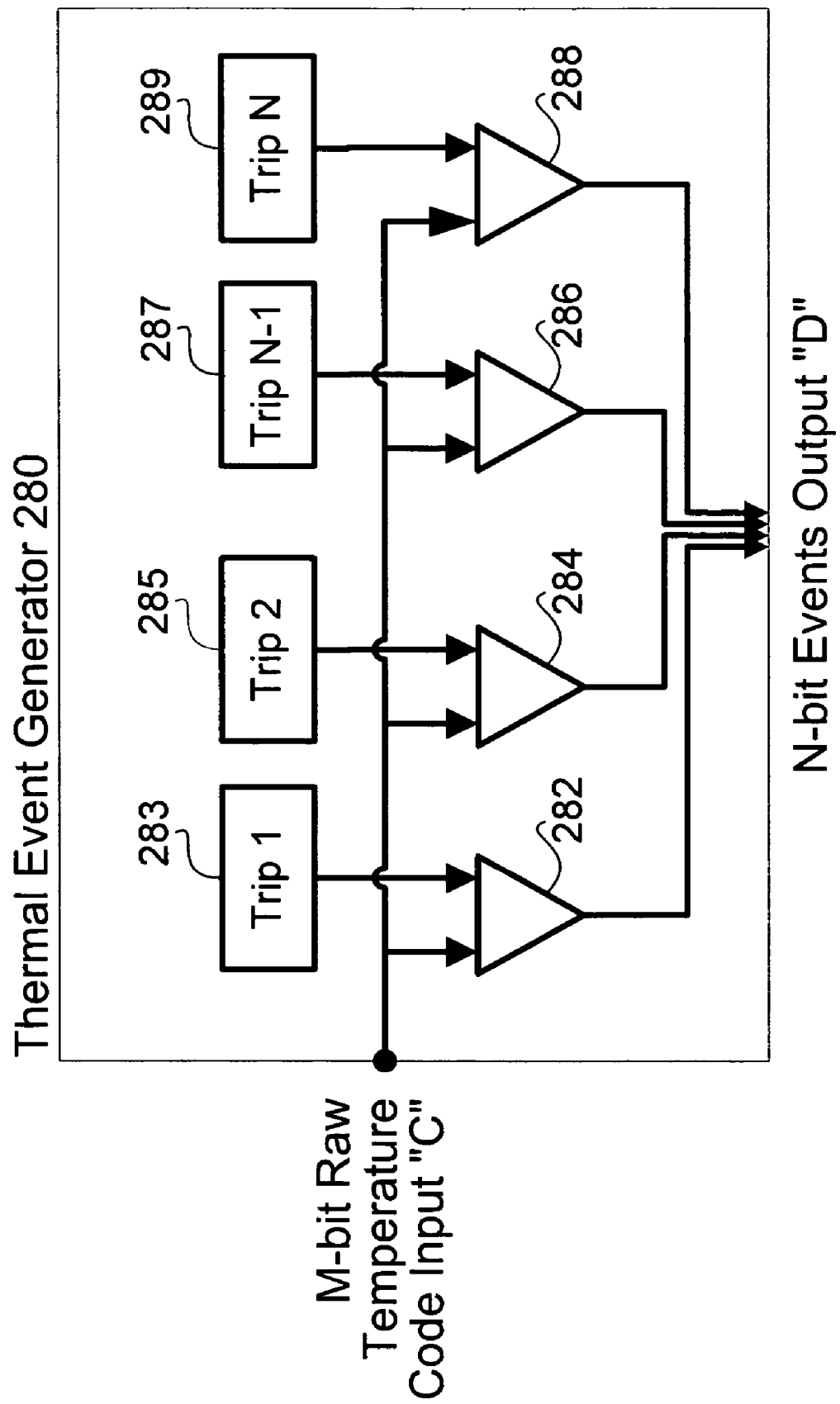
FIG. 5 is a schematic diagram of the thermal event generator circuit in FIG. 2.

FIG. 5 illustrates an exemplary embodiment of the temperature trip generation block 280. The temperature trip generation block 280 comprises a plurality of programmable trip points (283, 285, 287, and 289), each of which are compared (282, 284, 286, and 288) to a measured temperature reading (either raw or scaled). As described above, the programmable trip points may be programmed by software executed on the processor 110, and different trip points may be programmed for the various processor regions 115.

The results of the comparisons may be provided to the processor 110 by means of interrupts, and may also be used for other on-die and off-die thermal protection control. Exemplary interrupt-types include hardware interrupts, software interrupts, operating system interrupts, and BIOS (Basic Input/Output System) interrupts. The results of one or more of the comparisons may also be provided as output from the semiconductor die 200 for the control of off-die thermal management elements, such as external fans, cooling systems, and power supplies.

Figure 6:
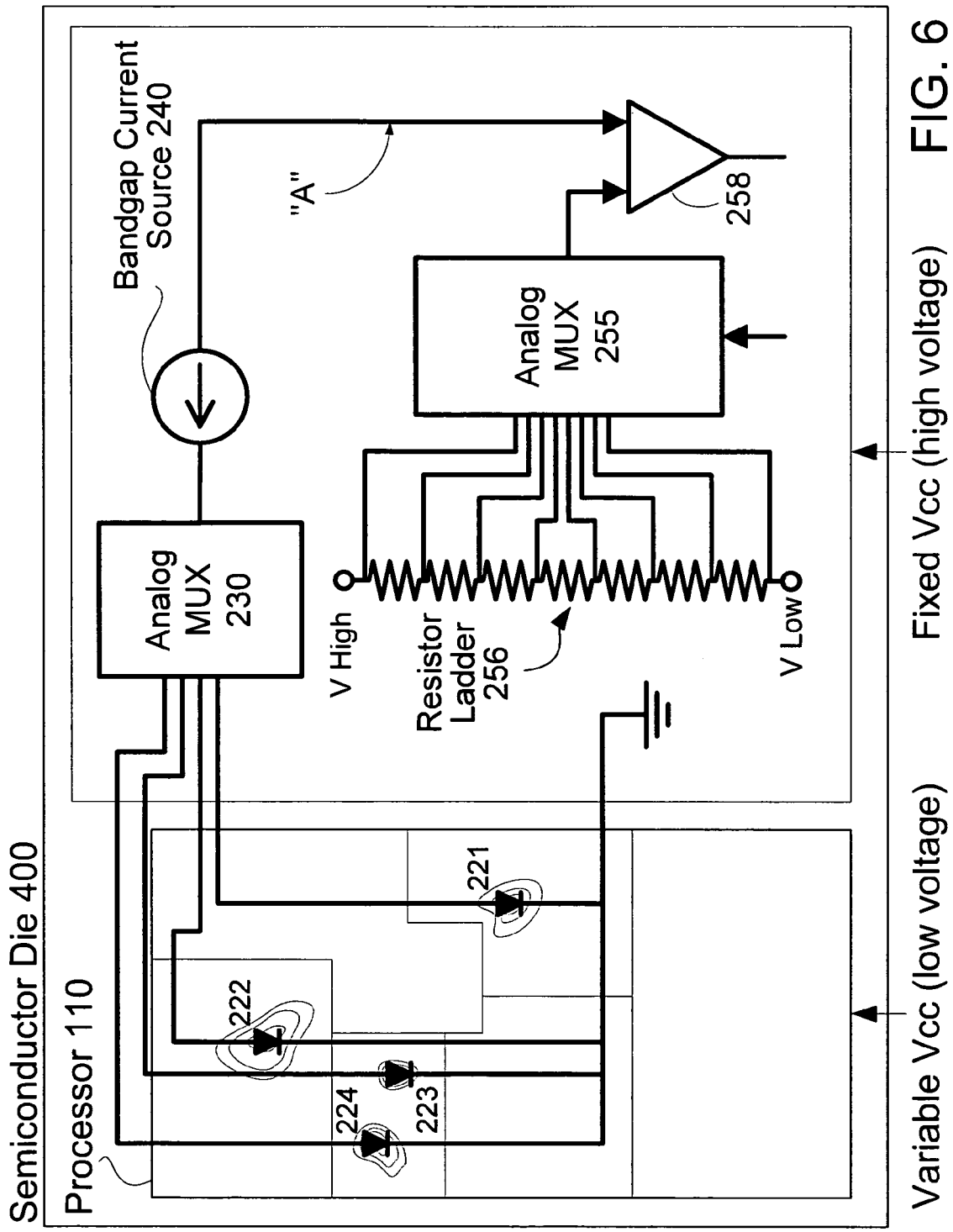
FIG. 6 illustrates an exemplary arrangement of supply voltages and circuits on a die.

FIG. 6 illustrates an embodiment of the invention separating the temperature calculation circuitry from the processor. The diode and at least analog multiplexer 230, the current source 240, the digital-to-analog converter 254/255/256, and the analog comparator 258 of the temperature calculation circuit are powered by a separate power source. The separation of the sensing diodes and the temperature calculation circuitry allows the core power supply to be OFF during calibration. If most of the die is quiescent, the calibration of the diodes during test and manufacturing is more accurate.

In comparison to the dynamically varying voltage supply used by most contemporary processors, the power supply for at least the analog temperature calculation circuitry may be a fixed high voltage source (in comparison to lower processor voltage levels) eliminating the need for voltage boosting on-die (i.e., no charge pump is required to boost processor voltages to the levels needed by the analog components of the temperature calculation circuit; associated noise-suppression filtering can likewise be omitted). This improves functionality and performance of the analog circuits by providing required headroom for the analog circuits to operate, and minimizes the influence of processor switching noise on temperature measurement. While the sensors are powered by the temperature calculation circuitry, the sensors may use the same ground reference as the processor, minimizing wiring complexity between the sensors and the measurement circuit.

Keeping the analog circuitry at the periphery of the dies facilitates the use of the fixed power supply, simplifying power supply isolation and keeping the power supply for the analog circuits quiet. Moreover, measured temperature accuracy during operation is improved by moving the analog circuitry away from the hotspots, since analog circuits (e.g., comparator 258) tend to be sensitive to changes in temperature.

Although not shown in FIG. 6, it should be understood that the die 400 may include the other elements described in connection with the other embodiments, including output from the die for the control of off-die thermal management elements.

Figure 7:
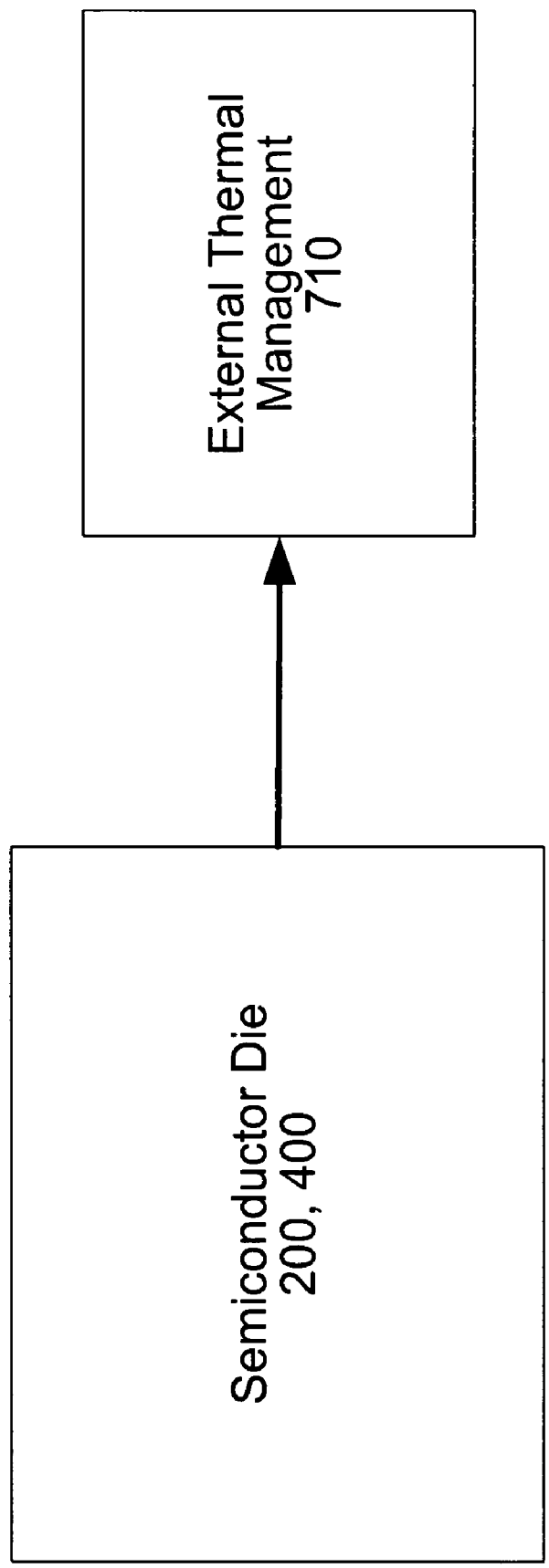
FIG. 7 illustrates a thermal management system including both on-die and off-die thermal management.

FIG. 7 illustrates a thermal management system including both on-die and off-die thermal management. Outputs (e.g., 201) from the dies of the various embodiments are used to control off-die thermal management 710 elements, including fans, cooling systems, and power supplies. Control of such elements may include activating external fans or cooling systems, or modifying the output of the external power supply.

According to the embodiments of the present invention, more efficient thermal control of the processor is realized, with improved thermal and acoustic management. The accurate temperature trips decrease performance degradation by reducing the amount of time before the thermal control circuit(s) are activated, while the reduction of the temperature guard band improves performance.

The ability to generate multiple trip points internally can be used with existing and new (e.g., adaptive, software-based) thermal and performance control mechanisms. Moreover, if thermal management is independently performed for different processor subsection (e.g., System-On-Chip), polling the sensors allows the thermal control circuits to tailor thermal and performance control mechanisms to a particular subsection (e.g., adjusting the clock speed or operating frequency of the subsection).

Today's models using an external diode have an extremely slow sampling rate, as well as a very slow response time to read temperature from an external A/D (analog-to-digital) device over an SMBus (System Management Bus; Version 2.0, August 2000; SBS Implementers Forum). Another advantage of the embodiments of the invention is the ability to report temperature measurements directly through the CPU to native software, providing improved response time, and further narrowing the guard bands normally applied by system designers to deal with the poor response time of present solutions.

Direct on-die temperature reporting is particularly advantageous for processors utilizing software control mechanisms triggered by management systems such as Advanced Configuration and Power Interface ("ACPI"; Revision 3.0, September 2004; Intel Corp., et al.) or System Management Mode ("SMM"), since the ability to report temperatures through the processor to native software improves response time, and provides system designers and manufacturer increased flexibility for adapting processor operation. Flexibility is further increased by using software-programmable temperature-responsive triggers, and by allowing software or firmware to modify temperature sensitivity.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A device comprising:
   a processor having a plurality of hotspots during operation, each hotspot being a localized region having a higher temperature than regions of the processor adjoining the respective hotspot;
   a plurality of p-n junctions, each within a hotspot of the plurality of hotspots, a junction voltage of each p-n junction to change as a function of temperature of the respective hotspot of the processor;
   a first analog multiplexer having inputs connected to the plurality of p-n junctions;
   a register to store a temperature code;
   a digital-to-analog converter to output an analog signal in accordance with a binary number;
   an analog comparator to compare the output from the digital-to-analog converter with an output from the first analog multiplexer, a logic-state transition in an output of the analog comparator to signal the register to store the binary number as the temperature code; and
   a digital comparison circuit, to compare the temperature code with a plurality of programmable temperature trip values, the processor to modify processor operation based upon comparison of the temperature code with the plurality of programmable temperature trip values.

2. The device according to claim 1, further comprising:
   a semiconductor die having the processor, the plurality of p-n junctions, the first analog multiplexer, the register, the digital-to-analog converter, the analog comparator, and the digital comparison circuit.

3. The device according to claim 2, wherein at least the first analog multiplexer, the analog comparator, and analog elements of the digital-to-analog converter are separated on the semiconductor die from the plurality of p-n junctions and the hotspots.

4. The device according to claim 3, wherein said at least the first analog multiplexer, the analog comparator, and analog elements of the digital-to-analog converter are at a periphery of the semiconductor die.

5. The device according to claim 3, the semiconductor die further comprising:
   a first power supply input to receive power for the processor; and
   a second power supply input to receive power for at least the plurality of p-n junctions, the first analog multiplexer, the analog comparator, and analog elements of the digital-to-analog converter,
   wherein electrical isolation is maintained on the semiconductor die between voltage from the first power supply input and voltage from the second power supply input.

6. The device according to claim 5, wherein the processor is to vary an operating voltage, using power received at the first power supply input, based upon the comparison of the temperature code with at least one of the plurality of programmable temperature trip values.

7. The device according to claim 5, wherein circuits connected to the first power supply input and circuits connected to the second power supply input share a common ground.

8. The device according to claim 1, further comprising:
   a counter to output a sequence of binary numbers to the digital-to-analog converter.

9. The device according to claim 8, wherein the counter is configured to output an alternating pattern of increasing and decreasing binary numbers, the digital-to-analog converter to convert the alternating pattern into the analog signal which over time has a triangular pattern alternating between a higher and a lower voltage potential.

10. The device according to claim 9, wherein the digital-to-analog converter comprises:
   a resistor ladder comprising a plurality of resistances in series, one end of the resistor ladder to connect to a higher voltage potential than an other end of the resistor ladder; and
   a second analog multiplexer having inputs electrically connected to hierarchy points on the resistor ladder, to select one of the inputs for output in accordance with the binary number.

11. The device according to claim 1, wherein the digital-to-analog converter comprises:
   a resistor ladder comprising a plurality of resistances in series, one end of the resistor ladder to connect to a higher voltage potential than an other end of the resistor ladder; and
   a second analog multiplexer having inputs electrically connected to hierarchy points on the resistor ladder, to select one of the inputs for output in accordance with the binary number.

12. The device according to claim 1, wherein the programmable temperature trip values of the digital comparison circuit are accessible to and modifiable from the processor.

13. The device according to claim 1, wherein the processor is to vary at least one of an operating voltage and an operating frequency based upon the comparison of the temperature code with at least one of the plurality of programmable temperature trip values.

14. The device according to claim 1, further comprising:
   a current source connected at the output of the first analog multiplexer, to be electrically connected to the p-n junction selected by the first analog multiplexer, through the first analog multiplexer, to provide bias current to the selected p-n junction.

15. The device according to claim 1, further comprising:
   a code conversion circuit to convert the temperature code into a formatted temperature code,
   the processor further comprising a software-readable register to store the formatted temperature code.

16. A method comprising:
   selecting a temperature sensor from a plurality of temperature sensors within hotspots of a processor on a semiconductor die, each hotspot being a localized region having a higher temperature than regions of the processor adjoining the respective hotspot;
   sensing a temperature in the hotspot of the selected temperature sensor;
   generating a temperature reading in accordance with the sensed temperature, the temperature reading being a digital number composed of a plurality of bits representing the sensed temperature; and
   controlling internal operations of the processor to regulate temperature based upon the temperature reading,
   each of said selecting, said sensing, said generating, and said controlling being performed by structures internal to the semiconductor die.

17. The method according to claim 16, wherein controlling the internal operation of the processor comprises generating interrupts according to a magnitude of the temperature reading relative to a plurality of threshold values.

18. The method according to claim 17, wherein said interrupts are selected from the group consisting of hardware interrupts, software interrupts, operating system interrupts, BIOS interrupts, and a combination thereof.

19. The method of claim 17, further comprising outputting at least one of the interrupts from the semiconductor die.

20. The method of claim 17, further comprising the processor executing instructions that modify the plurality of threshold values.

21. A method comprising:
   selecting a temperature sensor from a plurality of temperature sensors within hotspots of a processor on a semiconductor die, each hotspot being a localized region having a higher temperature than regions of the processor adjoining the respective hotspot;
   sensing a temperature in the hotspot of the selected temperature sensor;
   generating a temperature reading in accordance with the sensed temperature; and
   controlling internal operations of the processor to regulate temperature based upon the temperature reading,
   each of said selecting, said sensing, said generating, and said controlling being performed by structures internal to the semiconductor die,
   wherein controlling the internal operation of the processor comprises generating interrupts according to a magnitude of the temperature reading relative to a plurality of threshold values, and
   further comprising the processor executing instructions that modify the plurality of threshold values.

22. The method of 16, further comprising:
   selecting another temperature sensor from the plurality of temperature sensors; and
   repeating said sensing, said generating, and said controlling, for said another temperature sensor.

23. The method according to claim 16, further comprising:
   setting a resolution of a temperature sensor of the plurality of temperature sensors by programming a bias current provided to the temperature sensor.

24. The method according to claim 16, further comprising:
   providing to the semiconductor die a first power supply voltage for the processor, and separately providing a second power supply voltage for sensing the temperature in the hotspot.

25. The method of 16, further comprising storing the temperature reading, or a value based on the temperature reading, in a register readable by software executed on the processor.

26. The method of claim 16, wherein generating the temperature reading in accordance with the sensed temperature comprises:
   sequentially generating digital numbers;
   converting each digital number into an analog value;
   comparing the analog value to the sensed temperature; and latching the digital number corresponding to the analog value compared to the sensed temperature as said temperature reading if a result of comparing the analog value to the sensed temperature is a logic-state transition.

27. The method of claim 16, wherein controlling the operation of the processor comprises varying at least one of an operating voltage and an operating frequency based upon the temperature reading.

28. A method comprising:
selecting a temperature sensor from a plurality of temperature sensors within hotspots of a processor on a semiconductor die, each hotspot being a localized region having a higher temperature than regions of the processor adjoining the respective hotspot;
sensing a temperature in the hotspot of the selected temperature sensor;
generating a temperature reading in accordance with the sensed temperature; and
controlling internal operations of the processor to regulate temperature based upon the temperature reading,
each of said selecting, said sensing, said generating, and said controlling being performed by structures internal to the semiconductor die,
further comprising storing the temperature reading, or a value based on the temperature reading, in a register readable by software executed on the processor.

29. A system comprising:
a processor having a plurality of hotspots during operation, each hotspot being a localized region having a higher temperature than regions of the processor adjoining the respective hotspot;
a plurality of means for sensing temperature, each within a hotspot of the plurality of hotspots;
means for selecting one of the plurality of means for sensing temperature;
means for converting a binary number into an analog signal;
means for comparing the analog signal with output from the means for selecting one of the plurality of means for sensing temperature;
means for storing the binary number as a temperature code, based upon output from the means for comparing the analog signal with output from the means for selecting;
means for comparing the temperature code with a plurality of programmable temperature trip values, the processor to modify processor operation based upon output from the means for comparing the temperature code with the plurality of programmable temperature trip values;
a die having said processor, said plurality of means for sensing temperature, said means for selecting one of the plurality of means for sensing temperature, means for converting a binary number into an analog signal, said means for comparing the analog signal with output from the means for selecting one of the plurality of means for sensing temperature, said means for storing the binary number as a temperature code, and said means for comparing the temperature code with a plurality of programmable temperature trip values; and
means for thermal management, external to the die and responsive to output from the means for comparing the temperature code with the plurality of programmable temperature trip values.

30. The system according to claim 29, the die further comprising:
a first power supply input to receive power for the processor; and
a second power supply input,
wherein electrical isolation is maintained on the die between voltage from the first power supply input and voltage from the second power supply input, and
wherein at least said means for selecting one of the plurality of means for sensing temperature, said means for comparing the analog signal with output from the means for selecting one of the plurality of means for sensing temperature, and said means for converting a binary number into an analog signal are separated on the die from said plurality of means for sensing temperature and said hotspots, and are to receive power from said second power supply input.

31. The system according to claim 29, further comprising:
means for generating the binary number.

32. The system according to claim 29, further comprising:
means for converting the temperature code into a formatted temperature code,
the processor further comprising a software-readable register to store the formatted temperature code.

* * * * *